United States Patent

Laurer

[11] 4,037,105
[45] July 19, 1977

[54] RADIATION DETECTOR WITH ARRAY OF DIFFERENT SCINTILLATORS

[76] Inventor: Gerard R. Laurer, One N. Main St., Monroe, N.Y. 10950

[21] Appl. No.: 691,572

[22] Filed: June 1, 1976

[51] Int. Cl.² .................................................. G01T 1/20
[52] U.S. Cl. ................................. 250/367; 250/363 R
[58] Field of Search ......................... 250/367, 486, 363

[56] References Cited

U.S. PATENT DOCUMENTS

| 3,030,509 | 4/1963 | Carlson | 250/363 |
| 3,982,128 | 9/1976 | Groch et al. | 250/367 |

*Primary Examiner*—Harold A. Dixon
*Attorney, Agent, or Firm*—C. Bruce Hamburg

[57] ABSTRACT

Apparatus for detecting the location of a source of electromagnetic radiation is provided which does not employ a collimator. The need for a collimator is eliminated by the provision of a novel array of scintillators. The array comprises superposed scintillator crystals of three respective different types in their response to electromagnetic radiation. Three crystals of a first type are alternated with one crystal each of second and third types. An edge of each of the crystals is exposed at two opposed sides of the array. A first of the opposed sides is adapted to face a photomultiplier tube and the other of the opposed sides is adapted to receive radiation from a source which is to be detected. The respective edges of the second and third types of crystals at the radiation receiving side of the array are in a first plane and the respective edges of the first type of crystals at the radiation receiving side of the array are in a second plane spaced from the first plane. The array is used together with a photomultiplier tube facing the aforementioned first opposed side of the array for receiving light therefrom and means for distinguishing and counting pulses emanating from each of the three types of crystals.

3 Claims, 3 Drawing Figures

RADIATION DETECTOR WITH ARRAY OF DIFFERENT SCINTILLATORS

BACKGROUND OF THE INVENTION

This invention relates to a detector of electromagnetic radiation. More particularly, this invention relates to an electromagnetic radiation detector which can detect the location as well as measure the energy of a source of radiation, without the use of a collimator and with the use of only a single photomultiplier tube.

Electromagnetic radiation detectors commonly in use for locating a source of radiation employ pinhole collimators of lead or some other inactive, inert material. A disadvantage of these detectors is that the detection efficiency is poor due to the collimator and removal of te collimator results in inadequate spatial resolution, i.e., location of the source of radiation in an $x$, $y$, $z$ coordinate system. The problem can readily be appreciated by reference, for example, to a problem in health physics. In health physics, there is sometimes the need to locate the site of deposition of plutonium, a low-energy photon emitter, in the lungs for a more refined estimate of body burden versus external in vivo counting rate. A "gamma camera" was used to count a relatively heavily internally contaminated individual in an attempt to get information on the site of deposition. It was found that with the lead collimator in place, the count rate was too low to be meaningful, and without the collimator there was almost no resolution.

There have at various times been proposed in the prior art to use of an array of scintillators or radiation detectors to determine the direction or location of a source of radiation. Examples are U.S. Pat. Nos. 3,436,539; 3,539,806; and 3,594,577. However, in U.S. Pat. No. 3,436,539, radiation shielding and three photomultiplier tubes are required; in U.S. Pat. No. 3,539,806, a plurality of light reflecting partitions and a plurality of photomultiplier tubes are required; and in U.S. Pat. No. 3,594,577, a collimator having a plurality of holes and a plurality of photomultiplier tubes are required.

SUMMARY OF THE INVENTION

According to the invention, there is provided a novel array of scintillators adapted for use in combination with a photomultiplier tube for detecting the location of a source of electromagnetic radiation. The array comprises superposed scintillator crystals of three respective different types in their response to electromagnetic radiation, three crystals of a first type being alternated with one crystal each of second and third types, an edge of each of the crystals being exposed at two opposed sides of the array, a first of the opposed sides being adapted to face a photomultiplier tube and the other of the opposed sides being adapted to receive radiation from the source, the respective edges of the second and third types of crystals at the radiation receiving side of the array being in a first plane and the respective edges of the first type of crystals at the radiation receiving side of the array being in a second plane spaced from the first plane. In accordance with another aspect of the invention, the rest of the apparatus need comprise only a photomultiplier tube facing the first opposed side of the array for receiving light therefrom and means for distinguishing and counting pulses emanating from each of the three types of crystals.

The absence of a collimator is noteworthy. This feature enables simultaneously attaining high spatial resolution and high detection efficiency. Moreover, the bulk and weight of the apparatus is reduced as compared with prior art apparatuses which can be important in such applications as the mounting of the detector in a satellite. The use of only a single photomultiplier tube also contributes to this advantage.

DESCRIPTION OF A PREFERRED EMBODIMENT

The invention will now be further described by reference to a preferred embodiment, as illustrated in the drawings, in which.

Figure 1:
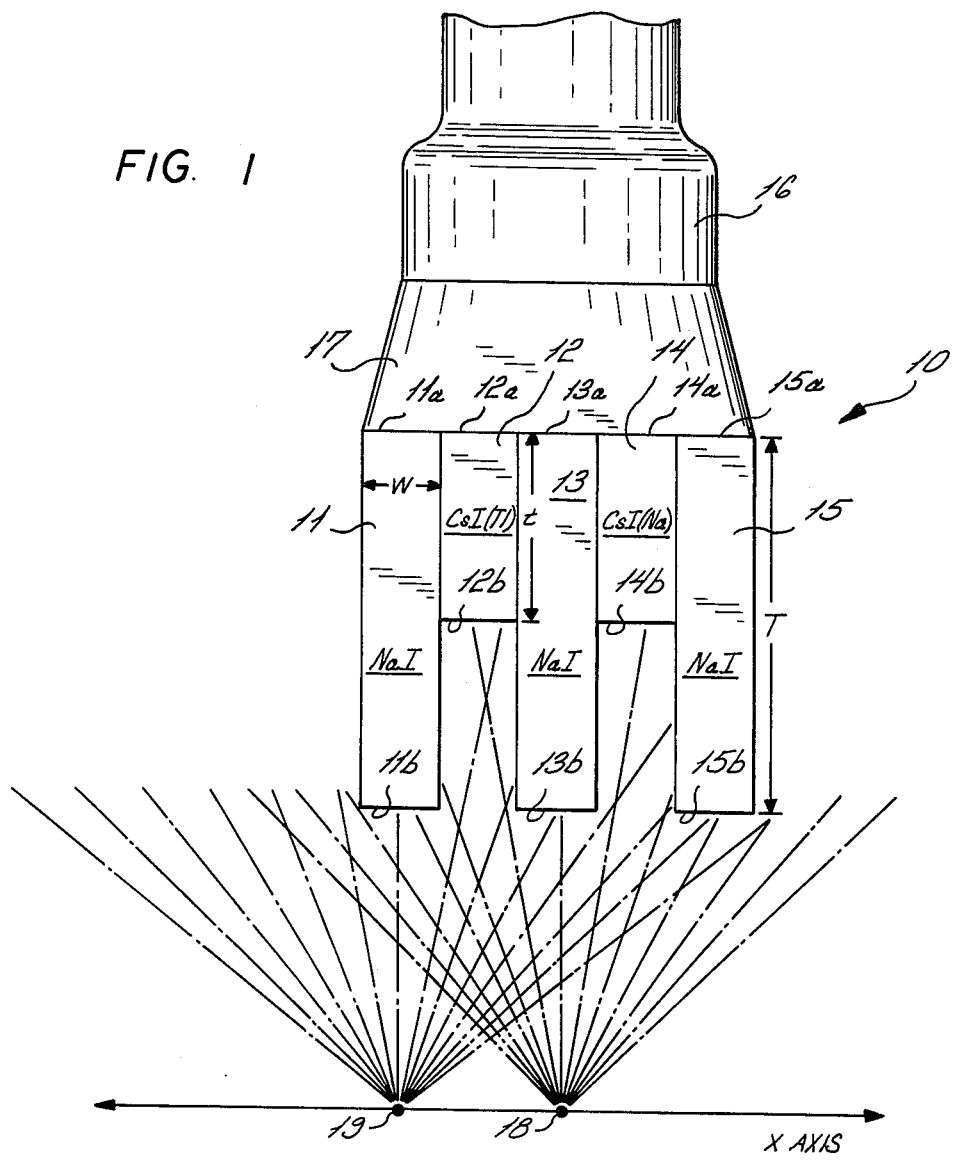
FIG. 1 is an elevation of an apparatus according to the invention together with a schematic representation of a source or radiation at two different positions on an imaginary $x$ axis.
Figure 2:
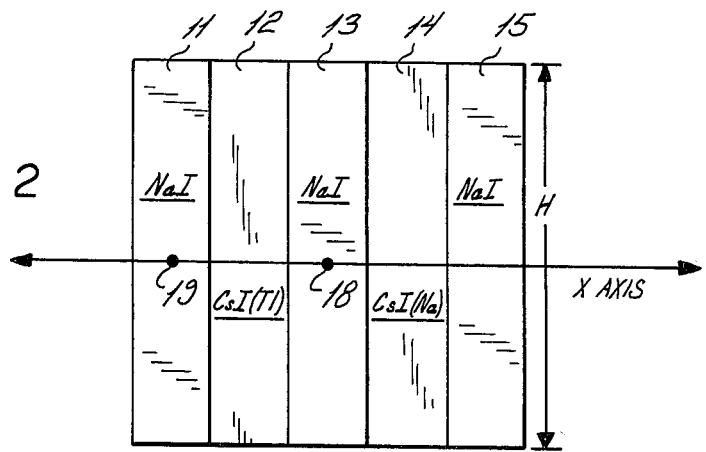
FIG. 2 is a plan view corresponding to FIG. 1.

With reference to FIGS. 1 and 2, it is seen that a detector element according to the invenion comprises an array 10 of five superposed crystals 11, 12, 13, 14 and 15, thallium activated sodium iodide crystals 11, 13 and 15 alternating with a thallium activated cesium iodide crystal 12 and a sodium activated cesium iodide crystal 14. The thallium activation of the cesium iodide crystal 12 is indicated by the chemical symbol for thallium in parenthese and, similarly, the sodium activation of the cesium iodide crystal 14 is indicated by the chemical symbol for sodium in parentheses. Thus, the thallium activated cesium iodide crystal and the sodium activated cesium iodide crystal are distinguished from each other. Because each of the sodium iodide crystals 11, 13 and 15 is thallium activated, it is not necessary to draw a distinction between one of these crystals and the next and, consequently, parenthetical indication of the thallium activation has been omitted. One side of the array 10 consisting of respective ends 11a, 12a, 13a, 14a, and 15a of the crystals 11, 12, 13, 14 and 15 faces a photomultiplier tube 16 through a quartz "square-to-round" light pipe adapter. This is necessary because the photomultiplier tube 16 is normally of circular cross-section whereas the array 10 of crystals is of square cross-section. The opposed side of the array 10 consisting of ends 11b, 12b, 13b, 14b and 15b of the respective crystals 11, 12, 13, 14 and 15 is aimed in the general direction of a source of radiation which is illustrated, for purposes of discussion, at a first position 18 on an imaginary $x$ axis and at a second, moved position 19 on the $x$ axis.

It can be seen that the crystal ends 12b and 14b are on a different plane from the crystal ends 11b, 13b and 15b. In a typical, illustrative embodiment, the width W of each of the crystals 11, 12, 13, 14 and 15 is 0.3 inch, the height H of each of the crystals is 1.5 inches, the thickness T of each of the sodium iodide crystals is 1.5 inches and the thickness $t$ of each of the cesium iodide crystals is 0.75 inch. This is but an example. The thickness T and $t$ are not related to each other in any fixed manner, but will be dependent on the photon energy range to be detected and on the degree of collimation desired. In each case, the optimization of these parameters can readily be determined both theoretically and empirically.

The source of radiation at a first position 18 and a second position 19 may conveniently be thought of as a point source of radiation. Of course, no source of radiation will be truly a point in the mathematical sense since it will have finite dimensions. The point source of radiation is isotropically emitting photons. For the sake of convenience of illustration, however, broken lines indicating radiation are shown emanating from the source of radiation only on the side facing the detector 10.

Thallium activated sodium iodide, thallium activated cesium iodide and sodium activated cesium iodide all give off light quanta of approximately 400 angstroms when photons interact and deposit energy in them. The amount of light given off in a given photo interaction in these crystals is proportional to the energy deposited. Hence, the light output serves not only to indicate the detection of a photon but also provides a spectrum of the energies of the interacting photons. The light output of these crystals is converted into useful voltage or current pulses by means of a photomultiplier tube 16. The detector 10 is used in conjunction with a single photomultiplier tube 16 which views, through the light pipe 17, all three crystal materials simultaneously. The output from the photomultiplier tube 16 is analyzed by the principle of pulse rise time discrimination or pulse shape discrimination for determination of the location of the source of radiation. Briefly, by means of pulse shape discrimination, the pulses due to photon interactions in the thallium activated sodium iodide, thallium activated cesium iodide and sodium activated cesium iodide may be separated from each other and either accepted or rejected for analysis by electronic coincidence circuitry. This will be better understood from the following discussion.

Assume, for example, that a point source of photons at a location 18 is centered with respect to the crystal array 10. Interactions will occur in the thallium activated sodium iodide crystals 11, 13 and 15 alone, the thallium activated cesium iodide crystal 12 alone and the sodium activated cesium iodide crystal 14 alone. Also, as a result of Compton scattering, interactions will occur simultaneously in adjacent crystals of thallium activated sodium iodide and thallium activated or sodium activated cesium iodide. With the use of pulse shape discrimination, however, it is possible to obtain an output signal from the detector for the thallium activated sodium iodide interactions alone, for the thallium activated cesium iodide interactions alone and for the sodium activated cesium iodide interactions alone, as well as to reject those signals that emanate from interactions occurring simultaneously in any two or more of the crystal elements. Thus, with the source of radiation at the position 18, there is a ratio of the signal for thallium activated sodium iodide interactions to the signal for thallium activated cesium iodide interactions and the signal for the sodium activated cesium iodide interactions that is unique to that particular position 18 of the source of radiation of the $x$ axis. As the source of radiation is moved to a second position 19 to the left of the first position 18, it can readily be appreciated that the aforementioned ratio changes to another value which is unique to that new position on the $x$ axis. One obvious difference, for example, is that the thallium activated cesium iodide will now receive more radiation than the sodium activated cesium iodide.

From the foregoing discussion, it can readily be seen that the same type of ratio may be obtained in the $y$ axis direction by turning the detector element through 90° and establishing the magnitude of the change in the aforementioned ratio as the detector moves along the $y$ axis. Thus, it is possible using the single detector element 10 and moving it incrementally along the $x$ and $y$ axes to obtain the position of a point source in the $x, y$ plane with a reasonable and selectable degree of resolution. It is also possible to trace the outline and shape of an organ or the area of the deposition site. The detector element, therefore, behaves in the same manner as a single crystal photon detector with a slit collimator of lead but with a significant difference, namely, the amount of signal available. Since the ratios of the aforementioned signals can be obtained electronically by pulse shape discrimination, the sum of the signals can also be obtained whereby the total radioactivity present at the site of deposition can be assessed. Hence, in contradistinction to the prior art, good spatial resolution and good detection efficiency are obtained simultaneously.

Figure 3:
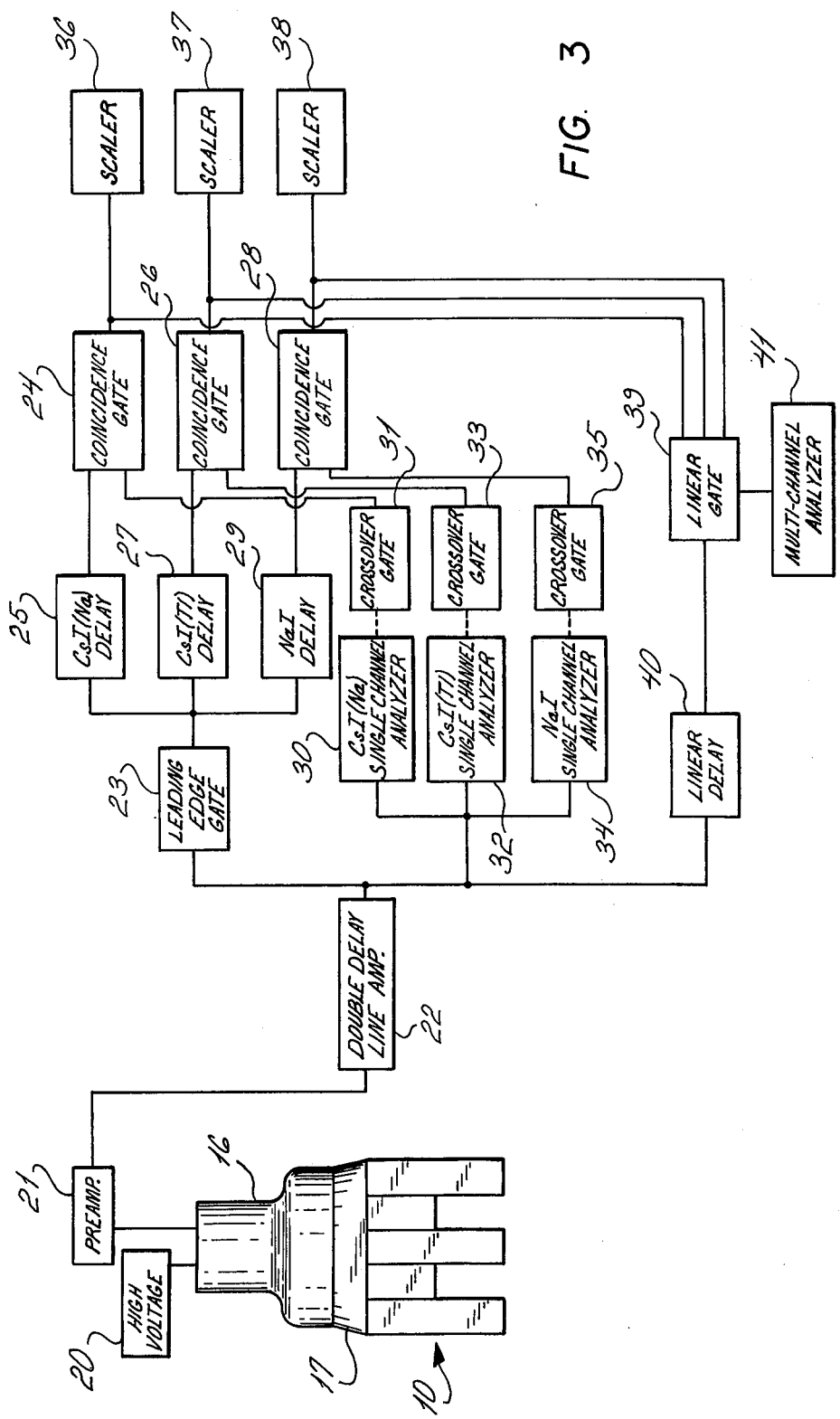
FIG. 3 is a block diagram of the electronics used in the apparatus of the invention.

FIG. 3 is a box diagram of exemplary electronics for use in the present invention. Such electronics for pulse shape discrimination is, in itself, known.

The system is powered by a high voltage source 20 which is connected to the photomultiplier tube 16, the photomultiplier tube 16 being optically connected to the detector crystal array 10 by the light pipe 17. The signals from the photomultiplier tube 16 are amplified by the preamplifier 21. Then, the double delay line amplifier 22 gives each pulse a bipolar shape. The leading edge gate 23 is triggered by the leading edge of the bipolar pulse. The leading edge gate 23 is connected to a coincidence gate 24 through a delay 25 for signals generated by photon interactions in the sodium activated cesium iodide crystals, to a coincidence gate 26 through a delay 27 for signals generated by photon interactions in the thallium activated cesium iodide crystals and to a coincidence gate 28 through a delay 29 for signals generated by photon interactions in the thallium activated sodium iodide crystals. At the same time the leading edge gate 23 is triggered, a single channel analyzer 30 for signals generated by photon interactions in the sodium activated cesium iodide crystals in combination with a crossover gate 31, a single channel analyzer 32 for signals generated by photon interactions in the thallium activated cesium iodide crystals in combination with a crossover gate 33 and a single channel analyzer 34 for signals generated by photon interactions in the thallium activated sodium iodide crystals in combination with a crossover gate 35 are triggered. The combination 30, 31 is connected to the coincidence gate 24, the combination 32, 33 is connected to the coincidence gate 26 and the combination 34, 35 is connected to the coincidence gate 28. The respective coincidence gates are triggered only when a signal from one of the aforementioned combinations coincides with a delayed signal from the leading edge gate 23. The respective coincidence gates 24, 26 and 28 are connected to respective scalers 36, 37 and 38 which count the signals from the respective coincidence gates. In this manner, photon interactions in the individual three different types of crystals are counted whereas signals resulting from interactions in a plurality of types of crystals are not counted. Thus, data are obtained from which the location in an $x, y$ plane of a source of radiation is determined by the principle described above.

Simultaneously with the foregoing, pulses are received from the double delay line amplifier 22 by the linear gate 39 through a linear delay 40. The linear gate 39 is also connected to the respective coincidence gates 24, 26 and 28. Simultaneous receipt by the linear gate 39 of a signal from the double delay line amplifier 22 and a signal from one of the coincidence gates 24, 26 and 28 turns on a multi-channel analyzer 41 which is connected to the linear gate 39. The multi-channel analyzer 41 analyzes the energy of the radiation source. Hence, simultaneously the location of the radiation source and the amount and nature of the radiation are determined.

Among the fields in which the present invention has utility are radiation physics and health physics, where health hazard assessment of internally deposited radioactivity requires location and quantity data, and medical diagnostic procedures, where the site of uptake of radioactivity has to be defined.

While the invention has been described with reference to a specific, preferred embodiment, it will be understood that modifications and variations obvious to one skilled in the art are intended to be encompassed within the scope of the invention as defined by the hereto appended claims. For example, it is apparent that the signal counts may be fed to a suitably programmed computer for determination of the location of the source of radiation.

What is claimed is:

1. An array of scintillators adapted for use without a collimator and in combination with a single photomultiplier tube for detecting the location of a source of electromagnetic radiation, comprising superposed scintillator crystals of three respective different types in their response to electromagnetic radiation, three crystals of a first type being alternated with one crystal each of second and third types, an edge of each of the crystals being exposed at two opposed sides of the array, a first of said opposed sides being adapted to face a photomultiplier tube and the other of said opposed sides being adapted to receive radiation from said source, the respective edges of the second and third types of crystals at the radiation receiving side of the array being in a first plane and the respective edges of the first type of crystals at the radiation receiving side of the array being in a second plane spaced from the first plane.

2. Apparatus for detecting the location of a source of electromagnetic radiation, comprising an array of scintillators according to claim 1, a photomultiplier tube facing said first opposed side of the array for receiving light therefrom and means for distinguishing and counting pulses emanating from each of the three types of crystals.

3. Apparatus according to claim 2 for detecting the location and also determining the energy of a source of electromagnetic radiation, further comprising means for measuring the energy of the radiation received by the array from the source by analyzing said pulses.

* * * * *